United States Patent [19]

Allen et al.

[11] 3,946,192

[45] Mar. 23, 1976

[54] METHOD OF MANUFACTURING A FRICTION DISC

[75] Inventors: Brian Robert Allen; Anthony William Harrison, both of Birmingham, England

[73] Assignee: Girling Limited, Birmingham, England

[22] Filed: May 17, 1974

[21] Appl. No.: 470,934

[30] Foreign Application Priority Data

May 19, 1973 United Kingdom............... 23965/73
Sept. 4, 1973 United Kingdom............... 41403/73

[52] U.S. Cl.......... 219/149; 29/420.5; 188/218 XL; 219/85
[51] Int. Cl.²............................................ B21J 1/06
[58] Field of Search..... 29/420, 420.5; 188/218 XL; 219/85 CM, 85 D, 85 F, 149

[56] References Cited
UNITED STATES PATENTS

| 2,986,252 | 5/1961 | DuBois | 188/218 XL |
| 3,214,271 | 10/1965 | Halberg et al. | 29/420.5 X |
| 3,335,256 | 8/1967 | Miller | 219/85 CM |
| 3,343,955 | 9/1967 | Talmage | 29/420.5 X |
| 3,435,935 | 4/1969 | Warman | 188/218 XL |
| 3,459,915 | 8/1969 | Swazy et al. | 219/149 X |
| 3,778,586 | 12/1973 | Breton et al. | 219/149 X |
| 3,857,469 | 12/1974 | Stimson | 188/218 XL |

Primary Examiner—J. V. Truhe
Assistant Examiner—N. D. Herkamp
Attorney, Agent, or Firm—Kane, Dalsimer, Kane, Sullivan and Kurucz

[57] ABSTRACT

A method of manufacturing a friction disc for use, inter alia, in a disc brake, the friction disc including a metal backing plate and a plurality of friction pads carried by the backing plate. The method comprises the steps of providing a plurality of powder compacts of friction material at the required positions on the backing plate, and resistance heating the powder compacts to sinter the compacts into the required friction pads and to bond the pads to the backing plate.

13 Claims, 5 Drawing Figures

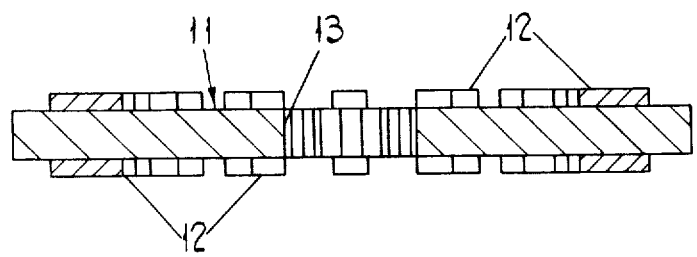
FIG. 1.
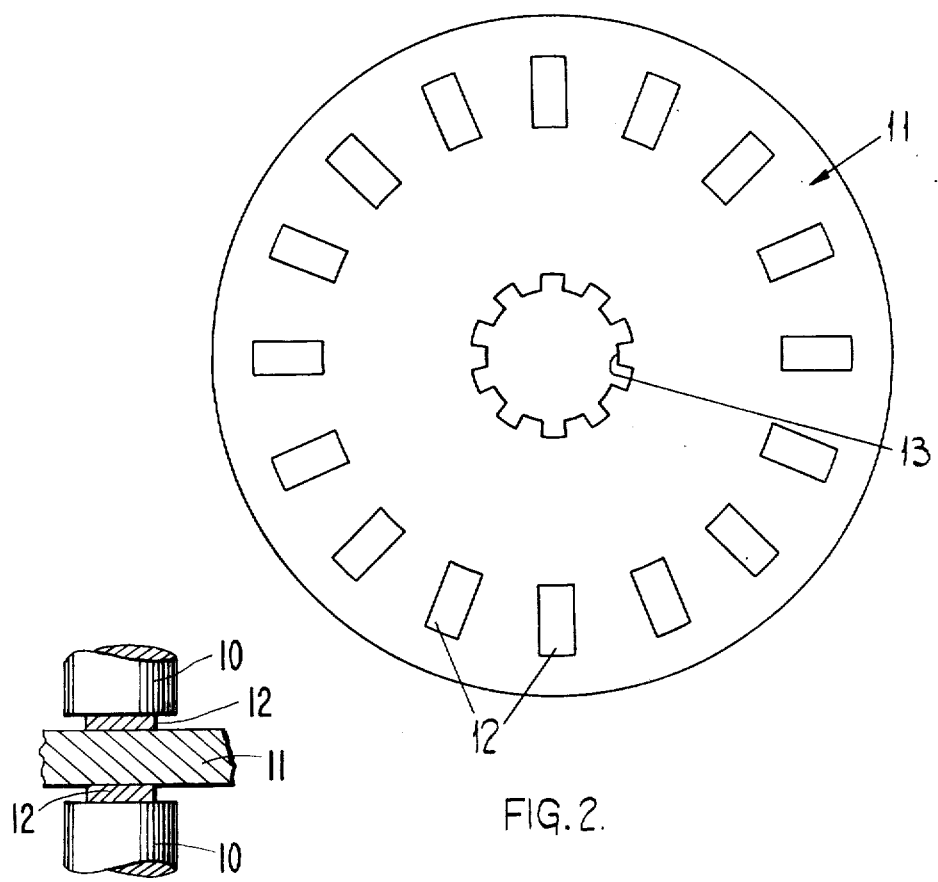
FIG. 2.
FIG. 2a

3,946,192

METHOD OF MANUFACTURING A FRICTION DISC

This invention relates to a method of manufacturing a friction disc for use, inter alia, in a disc brake.

In one aspect, the invention resides in a method of manufacturing a friction disc of the kind including a metal backing plate and a plurality of friction pads carried by the backing plate, the method comprising the steps of providing a plurality of powder compacts of friction material at the required positions on the backing plate, and resistance heating the powder compacts to sinter the compacts into the required friction pads and to bond the pads to the backing plate.

In a further aspect, the invention resides in a method of manufacturing a friction disc of the kind including a metal backing plate formed with a centrally disposed bore therein, with the wall of the bore being of splined form, and a plurality of friction pads carried by the backing plate on each major surface thereof and angularly spaced about said bore, the method comprising the steps of providing a plurality of powder compacts of friction material at the required positions on the backing plate, and resistance heating the powder compacts to sinter the compacts into the required friction pads and to bond the pads to the backing plate.

Preferably, each friction pad on one major surface of the backing plate is aligned with a respective friction pad on the opposite major surface of the backing plate.

Preferably, said powder compacts are received in respective recesses formed in the backing plate. Conveniently where the friction pads are aligned on opposite major surfaces of the backing plate, the recesses which receive the powder compacts necessary to produce a pair of aligned friction pads extend into and meet within a hole extending through the backing plate, the friction pads becoming bonded together through said hole during the resistance heating step.

Preferably, the backing plate is steel and is provided with brazing material at each of the positions on the backing plate where a friction pad is to be bonded thereto so that the resistance heating step produced a brazed joint between the friction pads on the backing plate.

In the accompanying drawings,

FIG. 1 is a sectional view of a friction disc manufactured by a method in accordance with a first example of the invention, FIG. 2 is a plan view of the friction disc shown in FIG. 1.

FIG. 2a is a sectional view illustrating one stage during a method according to the first example.

Figure 3:
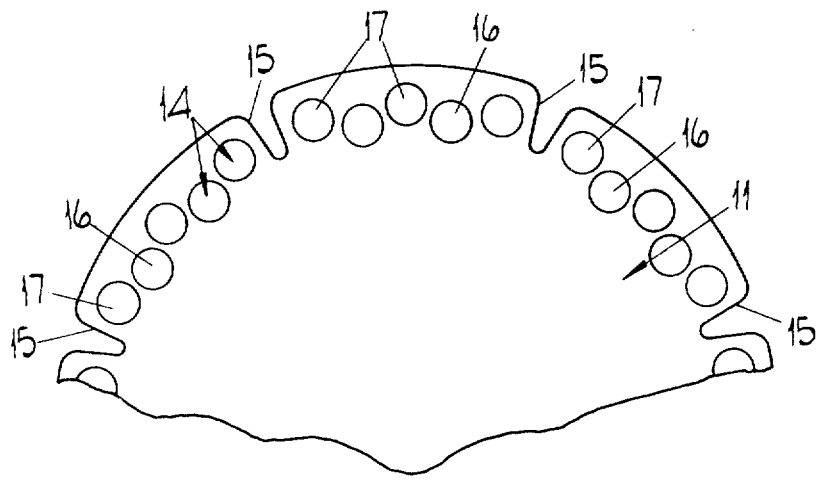
FIG. 3 is a plan view of part of a friction disc produced according to a modification of the first example.

Referring to FIGS. 1 and 2 of the drawings, the friction disc includes a circular mild steel backing plate 11 having a diameter of 9 inches and a thickness of 0.125 inch. On each major surface of the plate 11 there is provided a plurality of equi-angularly spaced friction pads 12 positioned adjacent the periphery of the plate 11 equally radially spaced from the center of the plate.

Each friction pad on one major surface of the disc is aligned with a respective friction pad on the opposite major surface of the disc. Moreover, each friction pad has a thickness of about 0.05 inch and is substantially rectangular in plan with its shorter side having a length of 0.35 inch and its longer side having a length of 0.70 inch and extending substantially radially inwardly.

The friction disc described above is intended for use in a road vehicle disc brake, and when in use is mounted, together with a further identical disc, in a housing (not shown) connected to a fixed part of the vehicle. A rotatable shaft (not shown), which is to be controlled by the brake, extends through the housing and is received in a centrally disposed bore 13 in the backing plate 11 of each friction disc. The wall of each bore 13 is of splined form and the portion of the shaft received in each bore is complementarily shaped so that the friction discs are rotatable with the shaft, but are also capable of axial movement relative to the shaft. The arrangement of the brake is then such that, when it is required to impart a braking force to the shaft, cam means (not shown) is operated to move the friction discs axially in opposite directions relative to the shaft so that the friction pads 12 engage friction surfaces on the housing.

In making the friction disc shown in the drawing, a powdered friction material having the following composition by weight is initially prepared:

60% copper, 12% tin, 2% lead, 9% zinc, 4% carbon and 13% silica. The friction material is prepared by mixing the components together in a Nautamix mixer for approximately 30 minutes, whereafter the material is removed from the mixer and then re-mixed for a further 30 minutes to ensure uniform distribution of the components. The mixture is to be used to produce the friction pads 12 and, for each friction pad 1.1gm of the mixture is placed in a suitably shaped die cavity and is compressed into a pellet at 15,000 (lb.f.).

After removal from the die cavity, a pair of the compacted pellets are then placed on the plate 11 on the required positions to produce a pair of aligned pressure pads 12 on opposite sides respectively of the plate 11, the whole plate having been previously plated with a 0.001 inch thick layer of a brazing material, such as copper, brass, bronze, tin, tin/zinc, zinc or nickel. Thus the plate 11 is provided with the brazing material at all the positions on the plate where the friction pads 12 are to be affixed. A pair of electrodes 10 are then pressed into contact with the pellets respectively, each electrode 10 having a molybdenum tip defining a substantially planar free end surface which engages its associated pellet. The electrodes 10 are used to apply a force of 132 lb.f. to the pellets and a current of 5,200 amps is passed through the electrodes to resistance heat the pellets. The heating operation is continued for 11 seconds, during which time the pellets are sintered into the required friction pads and simultaneously become bonded to the backing plate 11 by way of the brazing material. This operation is then repeated until all the pressure pads 12 have been produced on the plate 11.

During resistance heating of the pellets, the elemental constituents of the friction material form alloys which become sintered together in the friction pads 12. However, using the friction material having the composition defined above, it is found that during resistance heating of the pellets there is a tendency for the lower melting point elements in the friction material to melt and be expelled from the pellets before alloying takes place. Thus, it is preferable to perform an initial heating and pressing operation on the pellets at a lower temperature than is to be employed in the subsequent resistance heating so that the lower melting point elements form alloys before the resistance heating takes place. Alternatively, the friction material used to produce the pellets could be composed of alloys of the required elements.

It is also found that substantial temperature gradients exist in the pellets during the resistance heating operation so much so that the end position of each pellet remote from the plate 11 may only become partially sintered. Thus, to cater for this problem, it is preferable to arrange that the pellets are oversize and, after the resistance heating operation, to machine the resultant friction pads so as to remove the partially sintered end portions of the pads. Alternatively, this problem can be overcome by performing a final heating and pressing operation on the friction pads after the main resistance heating step and at a reduced temperature and pressure so as to complete sintering of said end portions of the friction pads.

It is to be appreciated that in the above example a plurality of pairs of friction pads on opposite sides respectively of the plate 11 could simultaneously or progressively be sintered and brazed in position on the plate by employing a plurality of separate pairs of electrodes.

As shown in FIG. 3 in a friction disc produced according to a modification of the first example, the backing plate 11 is provided on each major surface with a plurality of circular friction pads 14 instead of the rectangular pads of the first example. In this modification the plate 11 has a diameter of 8.8 inches and a thickness of 0.125 inch and extending radially into the plate from its periphery are eight equi-angularly spaced slots 15 (only four shown in FIG. 3) of length 0.625 inch and width 0.125 inch. The friction pads 14 are aligned on opposite major surfaces of the plate and on each major surface, extend continuously around the plate 11 adjacent its periphery in first and second circular rows 16, 17 respectively. The pads 14 are arranged so that there are sixteen pads in the first row 16 and twenty-four pads in the second row, there being 5 pads between adjacent slots 15.

The rows 16, 17 bound first and second circular, concentric annuli on each major surface the plate 11, the external diameter of the first annulus being less than the external diameter of the second annulus, which is in turn less than the external diameter of the plate 11 by between 0.025 and 0.03 inch. However, the external diameter of the first annulus is greater than the internal diameter of the second annulus so that the annuli overlap by an amount such that the radial distance between the internal periphery of the first annulus and the external periphery of the second annulus is greater than 0.8 inch and less than 1.2 inch, and preferably is 0.96 inch. Moreover, by varying the overlap between the rows 16, 17 within these limits, it is possible to vary the braking characteristics of the friction disc.

Each pad 14, has a diameter of 0.6 inch and a thickness of about 0.05 inch and is produced by compressing into a pellet 1.3gm of the powdered friction material described above at 17,000 lb.f. Resistance heating of the resultant pellet into the required friction pads is effected by the technique described above using a current of 4000 amps and an applied pressure of 110 lb.f.

Figure 4:
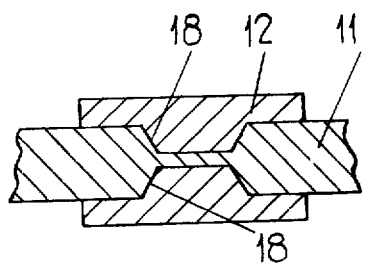
FIG. 4 is a sectional view of part of a friction disc manufactured in accordance with a second example of the invention.

Referring to FIG. 4 in a second example of the arrangement of the friction disc and the method of producing the disc are essentially as in the first example, but now a projecting portion of each pellet is received in, and conforms to, a respective recess 18 formed in the backing plate 11 so that the pellet is located in the required position on the backing plate. Moreover, the walls and base of each recess 18 are plated with a suitable brazing material, such as those described above, so that after the resistance heating step the resultant friction pad 12 is bonded in position in the recess. It will be appreciated that in the second example, each recess 18 could receive the full diameter of its respective pellet which could be of discoidal form as in the first example, joining then being effected at the base of each recess 18.

Figure 5:
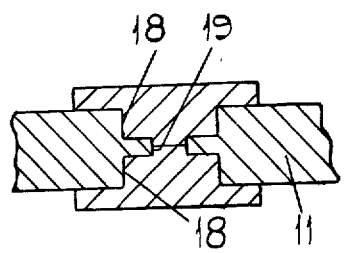
FIG. 5 is a sectional view of part of a friction disc manufactured in accordance with a modification of the second example.

As shown in FIG. 5, in a modification of the second example, the recesses 18 which receive a respective pair of pellets aligned on opposite major surfaces respectively of the backing plate 11 are arranged so as to extend into a hole 19 extending through the backing plate, the pellets conforming to their respective recesses 18 and to the hole 19 so as to meet within the hole. The arrangement is then such that when the pellets are sintered into the required friction pads by the resistance heating operation, the pads become bonded together through the hole in the backing plate.

It is to be appreciated that in conventional techniques for producing friction discs, the required friction material is bonded to the backing plate by sintering the entire assembly of the backing plate and the friction material in a furnace. Moreover, it is to be appreciated that when this technique is employed with a backing plate having a bore of splined form, such as is used in the method described above, a problem arises in that the sintering in the furnace tends to weaken the splines by the wall of the bore. However, by employing the resistance heating operation of the method described above, it is found that the friction material can be bonded to the backing plate with substantially no adverse effects on the strength of the splines.

Further, it is to be appreciated that in the above examples, after the friction pads have been bonded in position on the backing plate 11, grooves are formed in the exposed free end surfaces of the pads by means of a tool which is moved relative to the pads along a spiral path or in concentric circles whose centre is offset from the centre of the plate 11. Moreover, further grooves of width greater than the spiral or concentric grooves and normally termed "wagon tracks" may be provided in said free end surfaces of the pads in addition to the spiral or concentric grooves.

What is claimed is:

1. A method of manufacturing a friction disc of the kind including a metal backing plate and a plurality of friction pads carried by the backing plate on at least one major surface thereof, the method comprising the steps of providing a plurality of powder compacts of friction material at the required positions on said major surface of the backing plate, and resistance heating each of the powder compacts to sinter the compacts into the required friction pads and to bond the pads to the backing plate, the resistance heating of each powder compact being effected by urging one electrode of a pair of electrodes against said compact to press the compact against said major surface of the backing plate and then passing a heating current through the compact between said pair of electrodes.

2. A method as claimed in claim 1 wherein the backing plate is steel and is provided with brazing material at each of the positions on the backing plate where a friction pad is to be bonded thereto so that the resistance heating step produces a brazed joint between the friction pads and the backing plate.

3. A method as claimed in claim 2 wherein the brazing material is copper, brass, bronze, tin, zinc, a tin/zinc alloy, or nickel.

4. A method as claimed in claim 1 wherein the backing plate is circular and the friction pads are located on at least one major surface of the backing plate so as to be equally radially spaced from the centre of the plate.

5. A method as claimed in claim 1 wherein the backing plate is circular and the friction pads extend in first and second circular rows adjacent the periphery of the backing plate, the first and second rows defining respective overlapping, concentric, circular annuli.

6. A method as claimed in claim 1 wherein said one electrode presents a substantially planar end surface to the compacts.

7. A method as claimed in claim 1 wherein, prior to the resistance heating step, the compacts are subjected to an initial heating and pressing operation at a lower temperature than said resistance heating step.

8. A method as claimed in claim 1 and including the further step of resistance heating the sintered compacts at a lower temperature than that employed in said first mentioned resistance heating step.

9. A method of manufacturing a friction disc of the kind including a metal backing plate formed with a centrally disposed bore therein, with the wall of the bore being of splined form, and a plurality of friction pads carried by the backing plate on each major surface thereof and angularly spaced around said bore, the method comprising the steps of providing a plurality of powder compacts of friction material at the required positions on the backing plate, and resistance heating each of the powder compacts to sinter the compacts into the required friction pads and to bond the pads to the backing plate, the resistance heating of each powder compact being effected by urging one electrode of a pair of electrodes against said compact to press the compact against the adjacent major surface of the backing plate and then passing a heating current through the compact between said pair of electrodes.

10. A method as claimed in claim 9 wherein each friction pad on one major surface of the backing plate is aligned with a respective friction pad on the opposite major surface of the backing plate.

11. A method as claimed in claim 10 wherein at least a portion of each of said powder compacts is received in a respective recess formed in the backing plate.

12. A method as claimed in claim 11 wherein said portion of each compact conforms to its respective recess.

13. A method as claimed in claim 11 wherein the powder compacts necessary to produce a pair of aligned friction pads extend into and meet within a hole extending through the backing plate, the friction pads becoming bonded together through said hole during the resistance heating step.

* * * * *